A. COLEMAN.
Weeding Hoe.
No. 77,258.
Patented April 28, 1868.
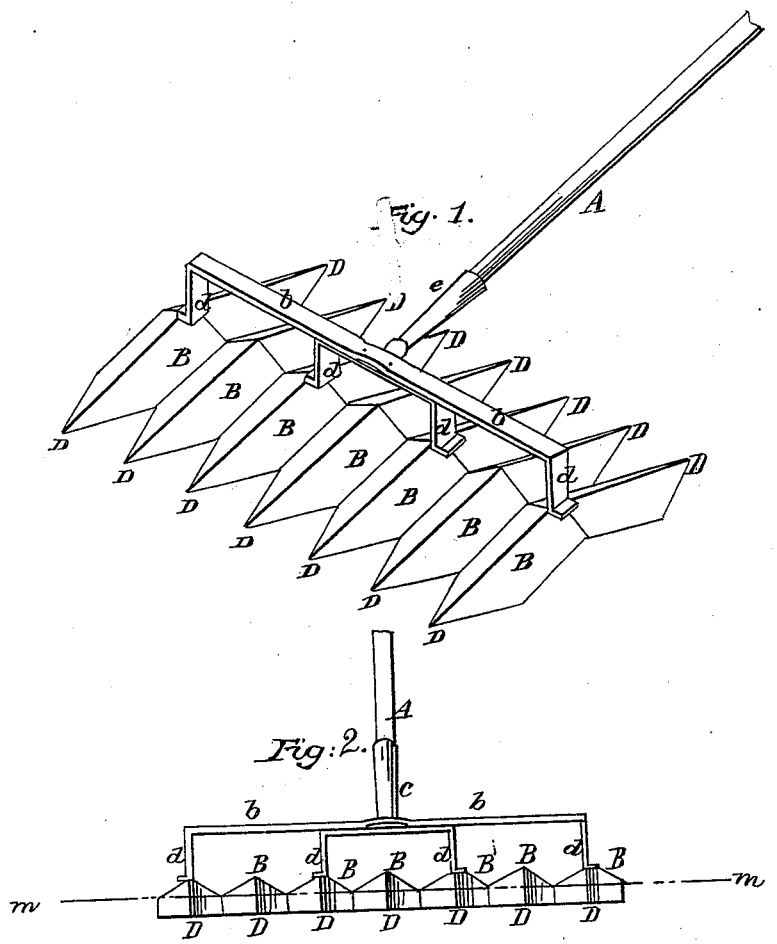

United States Patent Office.

ANDREW COLEMAN, OF RED BANK, NEW JERSEY.

Letters Patent No. 77,258, dated April 28, 1868.

IMPROVEMENT IN WEEDING-HOE.

*The Schedule referred to in these Letters Patent and making part of the same.*

TO ALL WHOM IT MAY CONCERN:

Be it known that I, ANDREW COLEMAN, of Red Bank, in the county of Monmouth, and State of New Jersey, have invented a new and improved Weeding-Hoe; and I do hereby declare that the following is a full, clear, and exact description thereof, which will enable those skilled in the art to make and use the same, reference being had to the accompanying drawings, forming part of this specification, in which—

Figure 1 is a perspective view of my improved weeding-hoe.

Figure 2 is an end view of the same.

Similar letters of reference indicate corresponding parts.

The nature of this invention relates to an improved form for pointed weeding-hoes, and consists in forming the plate forming the hoe of corrugated sections, as shown at B B B, &c.

The handle A is attached to this corrugated plate by means of a socket and iron frame, $b$, $d\,d\,d\,d$, as shown.

The hoe is formed by striking up a pointed plate, by means of dies, to the form shown, which is a succession of pointed arches, B B B B, &c., having each a V-shaped section.

The corrugations may be made without the arched character shown and described; but the operation of the hoe would not, if thus made, give such general satisfaction in all particulars.

The advantages gained by this form of weeding-hoe are as follows:

First, the hoe is stronger and more durable.

Second, the points D D D. &c., can be sharpened by merely rubbing them horizontally in contact with a flat stone.

Third, it pulverizes the soil, and, at the same time, eradicates weeds and other undesirable growth.

Fourth, it regulates the depth to which it enters the soil, and will not cut in deeper than is indicated by the line $m\,m$, fig. 2.

Fifth, it requires but little power to push it to and fro.

Sixth, it scatters the weeds and other growth about in passing under them, so that the roots will be exposed to the sun, and thereby killed.

Seventh, it will also serve a convenient purpose as a rake when occasion demands.

I claim as new, and desire to secure by Letters Patent—

1. A weeding-hoe, composed of a succession of connected corrugations, B B B, &c., formed from the same plate of sheet metal, substantially as and for the purpose shown and described.

2. The points D D D, &c., substantially as shown and described, in combination with the corrugations B B B, &c., all as and for the purpose set forth.

ANDREW COLEMAN.

Witnesses:
F. COLEMAN,
JOHN S. APPLEGATE.